Figure 1:
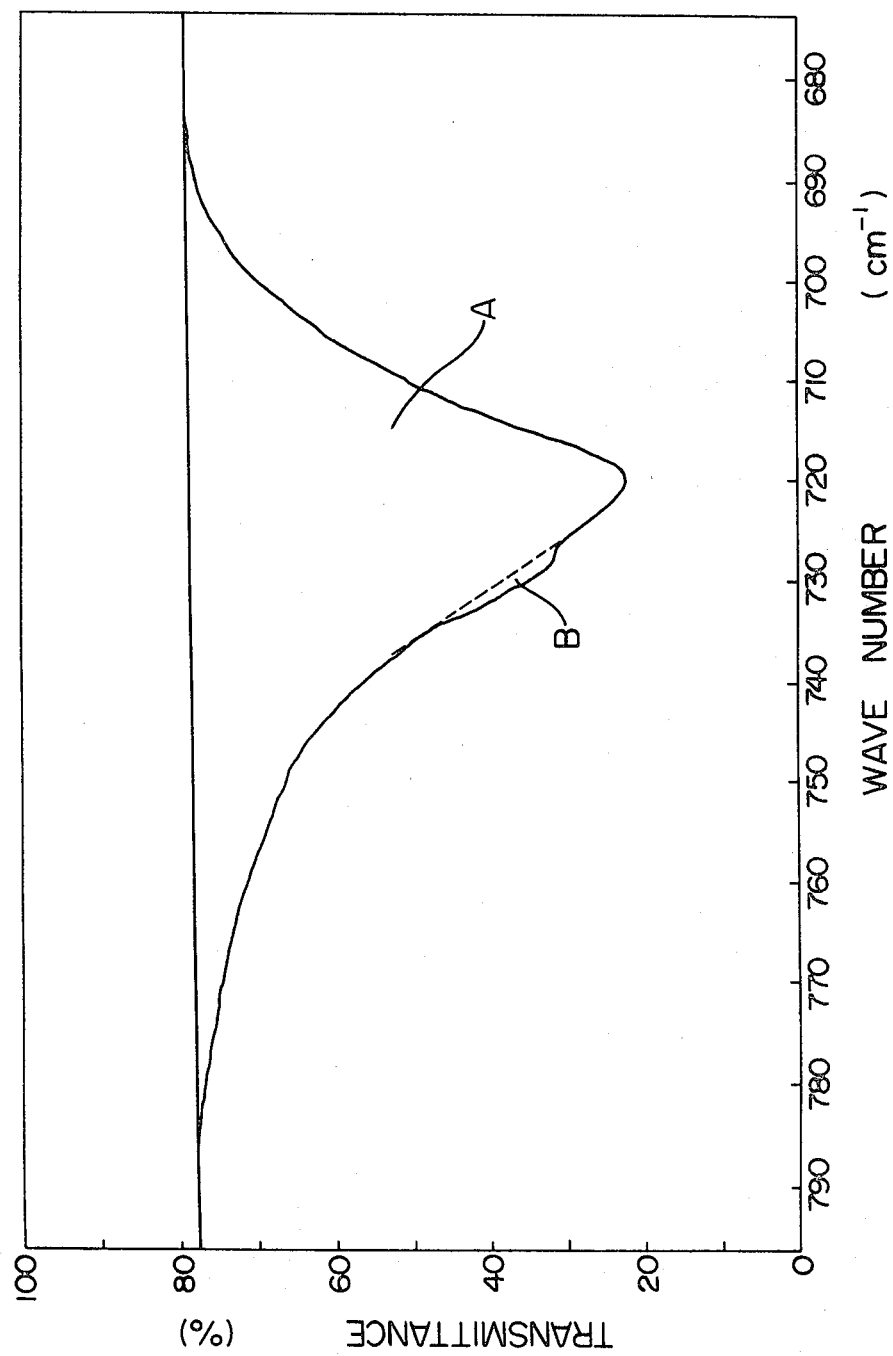

ium Patent [19]

United States Patent [19]
Makino et al.

[11] 4,377,671
[45] * Mar. 22, 1983

[54] PROCESS FOR PRODUCING OLEFINIC COPOLYMER RUBBERS

[75] Inventors: Kenya Makino, Kuwana; Hideo Sakurai; Masaru Watanabe, both of Yokkaichi; Toshiyuki Nishimura, Kameyama, all of Japan

[73] Assignee: Japan EP Rubber Co., Ltd., Mie, Japan

[*] Notice: The portion of the term of this patent subsequent to Dec. 28, 1999, has been disclaimed.

[21] Appl. No.: 281,048

[22] Filed: Jul. 7, 1981

Related U.S. Application Data

[63] Continuation of Ser. No. 194,274, Oct. 6, 1980, abandoned.

[30] Foreign Application Priority Data

| Oct. 6, 1979 [JP] | Japan | 54-128465 |
| Oct. 6, 1979 [JP] | Japan | 54-128466 |
| Oct. 23, 1979 [JP] | Japan | 54-135936 |
| Feb. 13, 1980 [JP] | Japan | 55-15496 |
| May 2, 1980 [JP] | Japan | 55-57879 |

[51] Int. Cl.³ .................. C08F 4/66; C08F 4/68
[52] U.S. Cl. .................. 526/124; 526/282; 526/283; 526/348

[58] Field of Search ............... 526/124, 125, 137, 142

[56] References Cited

U.S. PATENT DOCUMENTS

| 4,104,198 | 8/1978 | May et al. | 526/137 |
| 4,120,820 | 10/1978 | Birkelbach | 526/142 |

FOREIGN PATENT DOCUMENTS

| 51-123796 | of 1976 | Japan. |
| 51-16297 | of 1976 | Japan. |
| 52-148478 | of 1977 | Japan. |
| 53-104687 | of 1978 | Japan. |
| 54-39483 | of 1979 | Japan. |
| 1492864 | 11/1977 | United Kingdom. |

*Primary Examiner*—Stanford M. Levin
*Attorney, Agent, or Firm*—Wenderoth, Lind & Ponack

[57] ABSTRACT

In a process for producing a rubbery olefinic copolymer which comprises random-copolymerizing at least two olefins in the presence of a catalyst composed of (A) a titanium compound and (B) an organometallic compound of a metal of Groups I to III of the periodic table, the improvement wherein the titanium compound (A) of the catalyst is a solution of a solid titanium halide in a hydrocarbon solvent, a halogenated hydrocarbon solvent or a mixture of both, said solid titanium halide being rendered soluble in said solvent.

9 Claims, 5 Drawing Figures

PROCESS FOR PRODUCING OLEFINIC COPOLYMER RUBBERS

This application is a continuation application of application Ser. No. 194,274, filed Oct. 6, 1980 abandoned.

This invention relates to a process for producing an olefinic copolymer rubber having good processability, a high tensile strength and a highly random molecular arrangement in good yields using a solvent-soluble Ziegler-type catalyst. More specifically, it relates to a process for random copolymerization of at least two olefins using a solubilized titanium halide compound.

Catalyst systems composed of homogeneous vanadium compounds and organoaluminum compounds have been frequently used for production of rubbery copolymers by random copolymerization of at least two olefins. In general, however, these homogeneous vanadium catalysts are very liable to undergo deactivation during polymerization and do not have high activity at a temperature of 30° to 60° C. which is a practical polymerization temperature.

On the other hand, catalyst systems composed of titanium compounds and organoaluminum compounds are generally known to undergo less deactivation in polymerization. Use of these titanium compounds, however, tends to result in homopolymerization of the olefins to give a mixture of homopolymers. Or even if copolymerization does occur, block copolymers tend to form. Accordingly, the production of rubbery copolymers by titanium-type catalysts has not been commercially successful.

Some patent documents were recently published which are directed to the production of ethylene/alphaolefin copolymer rubbers with titanium-type catalysts (for example, Japanese Laid-Open Patent Publications Nos. 51381/74, 117886/75 and 104687/78). The methods disclosed in these patent documents involve random copolymerization of ethylene with an alpha-olefin using a catalyst composed of (i) a solid titanium catalyst component consisting of a titanium compound supported on a carrier and (ii) an organoaluminum catalyst component. Since the resulting copolymer does not have a highly random molecular arrangement, it deposits partly on the hydrocarbon solvent used in the polymerization. It is difficult therefore to obtain rubbery olefinic copolymers by solution polymerization using the catalysts suggested in these patent documents. Moreover, the resulting copolymers are plastics, and are difficult to use in the field of rubbers.

The present inventors made extensive investigations in an attempt to increase the randomness of the molecular arrangement of olefin copolymers using a titanium compound in the form of a solution instead of a solid titanium-type catalyst. It was found however that when at least two olefins are copolymerized using a catalyst composed of (a) a titanium compound soluble in an organic solvent, such as titanium tetrachloride, titanium triacetylacetonate or tetrabutoxy titanium and (b) an organoaluminum compound, the catalyst has very low polymerization activity, and a mixture of homopolymers of the olefins or a block copolymer of the olefins tends to form without formation of a rubbery copolymer.

The present inventors further attempted to copolymerize at least two olefins randomly by using a catalyst composed of a titanium compound uniformly dissolved in an organic solvent as an approximately trivalent titanium compound. To dissolve a solid titanium halide compound in a hydrocarbon solvent, a method comprising solubilizing titanium trichloride by treating it with an ether is known, for example, as shown in Japanese Laid-Open Patent Publications Nos. 16297/76, 123796/76, and 148478/77. The methods disclosed in these patent documents are characterized by the fact that the dissolved titanium trichloride is again precipitated and separated from the ether, and the precipitated titanium trichloride is used as a catalyst for stereospecific polymerization of propylene. In dissolving titanium trichloride, it is treated with at least an equimolar proportion, based on the titanium trichloride, of the ether. Generally, titanium trichloride together with at least an equimolar proportion of the electron donor generally has little or no activity as a catalyst for polymerization of olefins. In many patents relating to catalysts for olefin polymerization, when a solid titanium halide compound is treated with about an equimolar proportion of an electron donor, a step of removing the electron donor is generally performed subsequently. It was general knowledge that without the removal of the electron donor, the catalyst would have very bad performance.

It is an object of this invention therefore to provide a Ziegler-type catalyst capable of giving a rubbery olefinic copolymer having a highly random molecular arrangement, good processability and a high tensile strength.

In order to achieve the above object, the present inventors copolymerized at least two olefins using a catalyst prepared by treating a solid titanium halide compound with an ether, dissolving the treated titanium halide compound in a hydrocarbon or halogenated hydrocarbon solvent, and combining the resulting hydrocarbon or halogenated hydrocarbon solution with an organometallic compound of a metal of Groups I to III of the periodic table. Surprisingly, they consequently found that the catalyst exhibited very high activity, and a rubbery elastomeric copolymer having a highly random molecular arrangement, good processability and a high tensile strength could be obtained. This discovery has led to the present invention.

According to this invention, there is provided an improved process for producing a rubbery olefinic copolymer which comprises random-copolymerizing at least two olefins in the presence of a catalyst composed of (A) a titanium catalyst and (B) an organometallic compound of a metal of Groups I to III of the periodic table, characterized in that the titanium compound (A) of the catalyst is a solution of a solid titanium halide in a hydrocarbon solvent, a halogenated hydrocarbon solvent or a mixture of both, said solid titanium halide being rendered soluble in said solvent.

The greatest characteristic feature of the process of this invention lies in the fact that a solid titanium halide is subjected to solubilization treatment and used in the form of a solution in combination with an organometallic compound of a metal of Groups I to III of the periodic table. The invention has the marked advantage that this catalyst system has very high activity, and gives a highly random olefinic copolymer rubber having a high tensile strength and good processability.

The titanium halide in the form of a solution in the catalyst used in this invention may be obtained, for example, by the methods disclosed in the above cited Japanese Laid-Open Patent Publications Nos. 16297/76, 123796/76, and 148478/77 which comprise dissolving a solid titanium halide in a hydrocarbon solvent or a halogenated hydrocarbon solvent in the presence of an ether, or by a method which comprises dissolving the solid titanium halide in the aforesaid solvent in the presence of at least one halogen or inorganic halogen compound selected from the group consisting of halogens, inter-halogen compounds, halogen compounds of phosphorus or sulfur, and oxyhalogen compounds of sulfur (Japanese Laid-Open Patent Publication No. 39483/79). In the present application, the ethers and halogens or inorganic halogen compounds are referred to as a solubilizing agent for the solid titanium halide.

The ether used as the solubilizing agent is represented by the general formula $$R^1OR^2 \tag{1}$$

wherein $R^1$ and $R^2$ are identical or different, and each represents an alkyl, alkenyl, aralkyl or aryl group having 1 to 12 carbon atoms (preferably 6 to 12 carbon atoms in the case of using a hydrocarbon solvent, and 2 to 12 carbon atoms in the case of using a halogenated hydrocarbon). Specific examples of the ether are listed below.

(1) Dialkyl ethers

Diethyl ether, di-n-propyl ether, di-n-butyl ether, di-n-hexyl ether, di-n-octyl ether, di-n-decyl ether, di-n-dodecyl ether, di-n-tridecyl ether, and hexyloctyl ether.

(2) Dialkenyl ethers bis(1-Octenyl) ether, bis(1-decenyl) ether, and 1-octenyl-9-decenyl ether.

(3) Diaralkyl ethers bis(Benzyl) ethers.

(4) Alkylalkenyl ethers n-Octyl-1-decenyl ether, and n-decyl-1-decenyl ether.

(5) Alkylaralkyl ethers n-Octylbenzyl ether and n-decylbenzyl ether.

(6) Aralkylalkenyl ethers

1-Octenylbenzyl ether.

Among these ethers, those of general formula (1) in which $R^1$ and $R^2$ are linear alkyl groups are preferred.

The halogen or inorganic halogen compound used also as the solubilizing agent includes halogens, inter-halogen compounds, halogen compounds of phosphorus or sulfur and oxyhalogen compounds of sulfur.

Chlorine, fluorine, bromine and iodine are used as the halogen.

The inter-halogen compounds are expressed by the general formula $XY_n$ in which X and Y represent different halogens, and n is 1, 3, 5 or 7. Examples are ClF, BrF, BrCl, ICl, IBr, BrF$_3$, ClF$_3$, ICl$_3$, IF$_3$ and IF$_5$.

Examples of the halogen compounds and oxyhalogen compounds of phosphorus or sulfur are PCl$_3$, PCl$_5$, POCl$_3$, S$_2$Cl$_2$, SCl$_2$, SOCl$_2$, and PSCl$_2$.

Especially preferred halogens or inorganic halogen compounds are ICl$_3$, ICl, I$_2$, Br$_2$ and S$_2$Cl$_2$.

In the process of this invention, any solid titanium halide compound can be used as the titanium compound component of the catalyst. Suitable titanium halides are titanium trihalides such as titanium trichloride, titanium tribromide, and titanium triiodide. Titanium halide acetylacetonates and titanium halide alkoxides can also be used. Titanium trichloride is most preferred. A method for producing the solid titanium halide (i.e., titanium trichloride) is known per se., and includes, for example, (1) reduction of titanium tetrachloride with metallic aluminum, magnesium, titanium, etc., (2) reduction of titanium tetrachloride with hydrogen, (3) reduction of titanium tetrachloride with an organometallic compound.

The titanium trichloride obtained by such a method needs not to be pure TiCl$_3$. It may contain a chloride of the reducing agent (e.g., AlCl$_3$, MgCl$_2$) which has added thereto, or may contain the chloride of the reducing agent as an auxiliary component of the catalyst intentionally incorporated therein. Or it may contain small amounts of unreduced titanium tetrachloride and/or over-reduced titanium dichloride as unavoidable inclusions. Alternatively, the unreduced or over-reduced titanium halide may be incorporated intentionally in titanium trichloride.

Preferred titanium trichlorides are those obtained by reducing titanium tetrachloride with metallic aluminum, organoaluminum compounds or organomagnesium compounds. In contrast to other titanium trichlorides, these titanium trichlorides can be easily dissolved in hydrocarbon solvents or halogenated hydrocarbon solvents in the presence of an ether, a halogen or an inorganic halogen compound as the solubilizing agent to give solutions in high concentrations.

The mole ratio of the solubilizing agent (ether) to the solid titanium halide (e.g., titanium trihalide) is generally from 5:1, to 0.1:1, preferably from 2:1 to 0.2:1. In this case, the temperature required to treat the solid titanium halide with the ether is from $-30°$ C. to 120° C., preferably 0° C. to 60° C.

The mole ratio of the halogen or inorganic halogen compound as the solubilizng agent to the solid titanium halide is generally from 0.01:1 to 10:1, preferably from 0.05:1 to 5:1.

The temperature required for treating the solid titanium halide with the halogen or inorganic halogen compound is generally from $-80°$ C. to 300° C., preferably from 0° C. to the boiling point of the solvent used.

The time required to treat the solid titanium halide with the ether, halogen or inorganic halogen compound as the solubilizing agent is not particularly limited. But to dissolve the solid titanium halide compound completely, a period of at least 10 minutes is preferred.

The titanium halide component (A) in the form of a solution may further contain a magnesium compound or a tetravalent or pentavalent vanadium halide compound. The co-presence of this additional component has been found to increase the randomness of the molecular arrangement of the resulting copolymer further and lead to marked improvement of the catalytic activity of the catalyst system.

The magnesium compound as the additional component is a compound represented by the general formula $$Mg(OR)_nX_{2-n} \tag{2}$$

wherein OR represents an alkoxy group, X represents chlorine, bromine or iodine, and n is a number represented by $0 \leq n \leq 2$, or a product obtained by treating this compound with an electron donor. Suitable magnesium compounds are magnesium dihalides such as magnesium chloride, magnesium bromide and magnesium iodide. These magnesium compounds are preferably anhydrous.

Examples of the tetravalent or pentavalent vanadium compound used in this invention include vanadium tetrahalides, vanadium oxytrihalides, tris-(acetylacetone)vanadium and vanadium oxyacetylacetonate, and products obtained by treating these compounds with electron donors. The halogen is selected from chlorine, bromine and iodine. Preferred vanadium compounds are vanadium tetrachloride, vanadium oxytrichloride, and products obtained by treating these compounds with alcohols.

The mole ratio of the magnesium compound to the titanium compound used in this invention is generally 1:0.01-100, preferably 1:0.1-10, most preferably 1:0.1-1. The mole ratio of the titanium compound to the tetravalent or pentavalent vanadium compound is generally 1:0.01-10, preferably 1:0.02-1.

When the catalyst component (A) contains a magnesium compound or a vanadium compound in addition to the titanium compound, the amount of the solubilizing agent used is in the range of 0.1 to 10 moles, preferably 0.5 to 5 moles, per mole of the titanium compound and the magnesium compound or vanadium compound combined.

The solvent used in preparing the catalyst component (A) in solution form is a hydrocarbon solvent or a halogenated hydrocarbon solvent, or a mixture of both.

Saturated aliphatic hydrocarbons having 5 to 20 carbon atoms such as n-pentane, n-hexane, n-heptane, n-octane, n-dodecane and liquid paraffins are most suitable as the hydrocarbon solvent used in this invention. Alicyclic hydrocarbons having 5 to 12 carbon atoms such as cyclohexane and methylcyclohexane and aromatic hydrocarbons having 6 to 9 carbon atoms such as benzene and toluene may also be used. These hydrocarbon solvents may also be used in combination with each other.

Halogenated aliphatic hydrocarbons having 1 to 10 carbon atoms, halogenated alicyclic hydrocarbons having 5 to 12 carbon atoms and halogenated aromatic hydrocarbons having 6 to 9 carbon atoms can generally be used as the halogenated hydrocarbon solvent. These halogenated hydrocarbons may also be used in combination with each other. Specific examples of the halogenated hydrocarbons are given below.

(1) Halogenated aliphatic hydrocarbons

Methylene chloride, chloroform, carbon tetrachloride, monochloroethane, ethyl iodide, 1,2-dichloroethane, 1,1-dichloroethane, 1,1,2-trichloroethane 1,1,1-trichloroethane, 1,1,2,2-tetrachloroethylene, n-butyl chloride and n-butyl iodide.

(2) Halogenated alicyclic hydrocarbons

Chlorocyclohexane.

(3) Halogenated aromatic hydrocarbons

Chlorobenzene, bromobenzene, and iodobenzene.

Among these halogenated hydrocarbons, the halogenated aliphatic hydrocarbons are preferred.

When an ether of the general formula $R^1OR^2$ in which $R^1$ and $R^2$ have less than 6 carbon atoms and halogen or an inorganic halogen compound are used as the solubilizing agent, it is necessary to use the halogenated hydrocarbon solvent.

The catalyst component (A) in the form of a solution can be easily obtained by mixing the above-exemplified solid titanium halide in the pulverized state with the solubilizing agent and the solvent to dissolve the solid titanium halide in the solvent in the presence of the solubilizing agent. The sequence of mixing is optional, but preferably, the solid titanium halide is first mixed with the solvent and adding the solubilizing agent to the mixture.

The suitable concentration of titanium in the hydrocarbon solvent is 0.001 to 5 moles/liter, preferably 0.01 to 1.0 mole/liter.

When the catalyst component (A) contains the magnesium compound or vanadium compound as the additional component, it can also be obtained by simply mixing the pulverized solid titanium halide, the pulverized magnesium compound or vanadium compound, the solubilizing agent and the solvent, thereby to dissolve the solid titanium halide in the solvent in the presence of the solubilizing agent to afford the catalyst component (A) in the form of a solution. The sequence of mixing the aforesaid materials is optional.

For example, when an ether is used as the solubilizing agent, the catalyst component (A) in the form of a solution containing the titanium halide and the magnesium compound may be obtained, for example, by the following methods.

(1) The titanium halide and the magnesium compound are co-pulverized, and treated with the ether in the solvent to obtain a liquid component.

(2) The titanium halide, the magnesium compound and a small amount of the ether (in an amount of 0.05 to 0.5 molar time the total amount of titanium and magnesium) are co-pulverized, and treated with the ether in the solvent to obtain a liquid component.

(3) The magnesium compound is singly pulverized, and then treated with the ether in the solvent to swell the magnesium compound. The titanium halide separately pulverized is added to the magnesium compound to form a liquid component.

(4) The magnesium compound and a small amount of the ether (in an amount of 0.05 to 0.5 molar time the amount of magnesium) are co-pulverized, and then treated with the ether in the solvent to swell the magnesium compound. The titanium halide separately pulverized is added to the swollen magnesium compound to form a liquid component.

(5) The titanium halide is pulverized singly, and then treated with the ether in the solvent to form a liquid component. Then, the magnesium compound separately pulverized is added, and the mixture is sufficiently stirred to dissolve it.

(6) The titanium halide is pulverized singly, and then treated with the ether in the solvent to form a liquid component. Then, a co-pulverization product of the magnesium compound and a small amount of the ether (in an amount corresponding to 0.05 to 0.5 molar time the amount of magnesium), and the mixture is fully stirred to dissolve these compounds.

The method (1) is most preferred among these methods.

Pulverizing means used in the production of the catalyst component (A) in the form of a solution include, for example, a ball mill, a vibratory mill, an impact mill, etc. There is no need to perform the pulverization under cooling or heating, and it is sufficient to perform it at room temperature. The pulverization time may be varied depending upon the pulverizing power of the mill, and for example in the case of the vibratory mill, the pulverization time is usually about 1 to 100 hours.

The temperature used to treat the pulverization product with the ether in the solvent is usually from 0° C. to the boiling point of the solvent. The treating time is that required until the pulverization product is completely dissolved or swollen, and usually it is about 10 minutes to about 10 hours.

The resulting catalyst component (A) in the form of a solution containing the titanium halide and the magnesium compound conveniently contains 0.001 to 5 moles/liter, preferably 0.01 to 1 mole/liter, of titanium dissolved in the solvent, and 0.001 to 5 moles/liter, preferably 0.005 to 2 moles/liter, of magnesium.

When taking up an example of using titanium trichloride as the titanium halide and the ethers as the solubilizing agent, the catalyst component containing the titanium halide and the tetravalent or pentavalent vanadium may be prepared by dissolving solid titanium trichloride in an organic solvent in the presence of the vanadium compound and the ether.

The sequence and manner of adding the vanadium compound and the ether is not particularly limited. The temperature used in dissolving titanium trichloride is usually from $-30°$ C. to the boiling point of the solvent, preferably from $0°$ C. to the boiling point of the solvent. Stirring is performed at this time until titanium trichloride is dissolved completely. Usually, it is performed for about 5 minutes to about 50 hours, preferably from 10 minutes to 10 hours.

The concentration of titanium in the catalyst solution is generally 0.001 to 5 moles/liter, preferably 0.01 to 1 mole/liter, and the concentration of vanadium is generally from 0.001 to 5 moles/liter, preferably 0.01 to 1 mole/liter.

The catalyst component (B) used in the present invention is an organometallic compound of a metal of Group I to III of the periodic table. Examples include organolithium compounds, organozinc compounds, organomagnesium compounds and organoaluminum compounds. Of these, organoaluminum compounds are preferred.

Generally, suitable organoaluminum compounds are those of the general formula $$AlR_mX_{3-m} \qquad (3)$$

wherein R represents a hydrogen atom or a hydrocarbon group having about 1 to about 20 carbon atoms,
X represents a halogen atom or an alkoxy group having about 1 to about 20 carbon atoms; and m is a number represented by $1 \leq m \leq 3$.

Two or more organoaluminum compounds may be used in combination with each other. Specific examples of the organoaluminum compounds are triethyl aluminum, tri-n-propyl aluminum, tri-i-butyl aluminum, tri-n-octyl aluminum, tri(2-methylpentyl)aluminum, di-i-butyl aluminum hydride, ethyl aluminum sesquichloride, diethyl aluminum chloride, ethyl aluminum dichloride, diethyl aluminum ethoxide, and diethyl aluminum iodide. Among these organoaluminum compounds, trialkyl aluminums are especially preferred.

The ratio of the catalyst component (A) to the catalyst component (B) is expressed by the atomic ratio of titanium to aluminum, or the atomic ratio of the sum of titanium and magnesium or vanadium to aluminum, and is usually from 1:0.2 to 1:200, preferably from 1:1 to 1:50.

In the present invention, at least two olefins are random-copolymerized in the presence of a catalyst composed of the components (A) and (B) described hereinabove. Suitable olefins for use in this invention are alpha-olefins such as ethylene, propylene, butene-1,4-methyl-pentene-1, hexene-1, and octene-1. The olefinic copolymer rubber can be produced by copolymerizing at least two of these olefinic monomers.

These olefinic monomers are used in such proportions that the content of an olefin unit which is largest in amount among the olefin units constituting the copolymer rubber is not more than 80% by weight, preferably not more than 70% by weight.

The catalyst in accordance with this invention is especially suitable for production of an ethylene/propylene copolymer rubber by copolymerizing ethylene with propylene.

In order to facilitate vulcanization of the resulting copolymer rubber, a non-conjugated polyene monomer may be copolymerized with the olefin monomer. There can be used non-conjugated polyene compounds of any desired types such as crosslinked cyclic hydrocarbon compounds, monocyclic compounds, heterocyclic compounds, aliphatic compounds and spiro-type compounds. Specific examples of the non-conjugated dienes include dicyclopentadiene, tricyclopentadiene, 5-methyl-2,5-norbornadiene, 5-methylene-2-norbornene, 5-ethylidene-2-norbornene, 5-isopropylidene-2-norbornene, 5-isopropenyl-2-norbornene, 5-(1-butenyl)-2-norbornene, 5-(2'-butenyl)-2-norbornene, cyclooctadiene, vinylcyclohexene, 1,5,9-cyclododecatriene, 6-methyl-4,7,8,9-tetrahydroindene, 2,2'-dicyclopentenyl, trans-1,2-divinylcyclobutane, 1,4-hexadiene, 1,6-octadiene, and 6-methyl-1,5-heptadiene. Among these non-conjugated polyenes, 5-ethylidene-2-norbornene and dicyclopentadiene are preferred.

The polymerization temperature is usually 0° to 120° C., preferably 20° to 80° C. The polymerization pressure is usually from normal atmospheric pressure to 50 kg/cm$^2$. The polymerization is generally carried out conveniently by a solution polymerization method by which the polymerization is carried out in a solvent for the copolymer. A hydrocarbon solvent such as n-hexane and n-heptane is frequently used as the solvent for the polymerization. The copolymerization may be carried out batchwise or continuously. The molecular weight of the copolymer can be controlled as required by using hydrogen.

The following Examples illustrate the present invention more specifically.

The various properties of the copolymer in these examples were measured by the following methods.

Mooney viscosity

The sample is pre-heated for 1 minute, and its Mooney viscosity is measured for 4 minutes at 100° C.

Propylene content

Measured by infrared absorption spectroscopy.

Indine value

Measured by a titration method.

100% modulus, tensile strength, break elongation and Shore A hardness

Measured by methods substantially in accordance with JIS K6301.

A random index (R.I.) was used as a measure of random arrangement of ethylene and propylene in the copolymer. From the infrared absorption spectrum of the sample copolymer, the absorption intensity at 730 cm$^{-1}$ (ascribable to the crystallinity of polyethylene) and the absorption intensity at 720 cm$^{-1}$ (ascribable to the skeleton vibration of $-(CH_2)_n-$). Let the areas of these absorption intensities be A and B respectively, then R.I. is calculated from the following equation.

$$R.I. (\%) = \frac{\text{Area } B}{(\text{Area } A + \text{Area } B)} \times 100$$

The accompanying drawings are enlarged views of the absorption parts at 720 and 730 cm$^{-1}$ in an infrared absorption spectrum of the copolymer sample for determining R.I.

Figure 2:
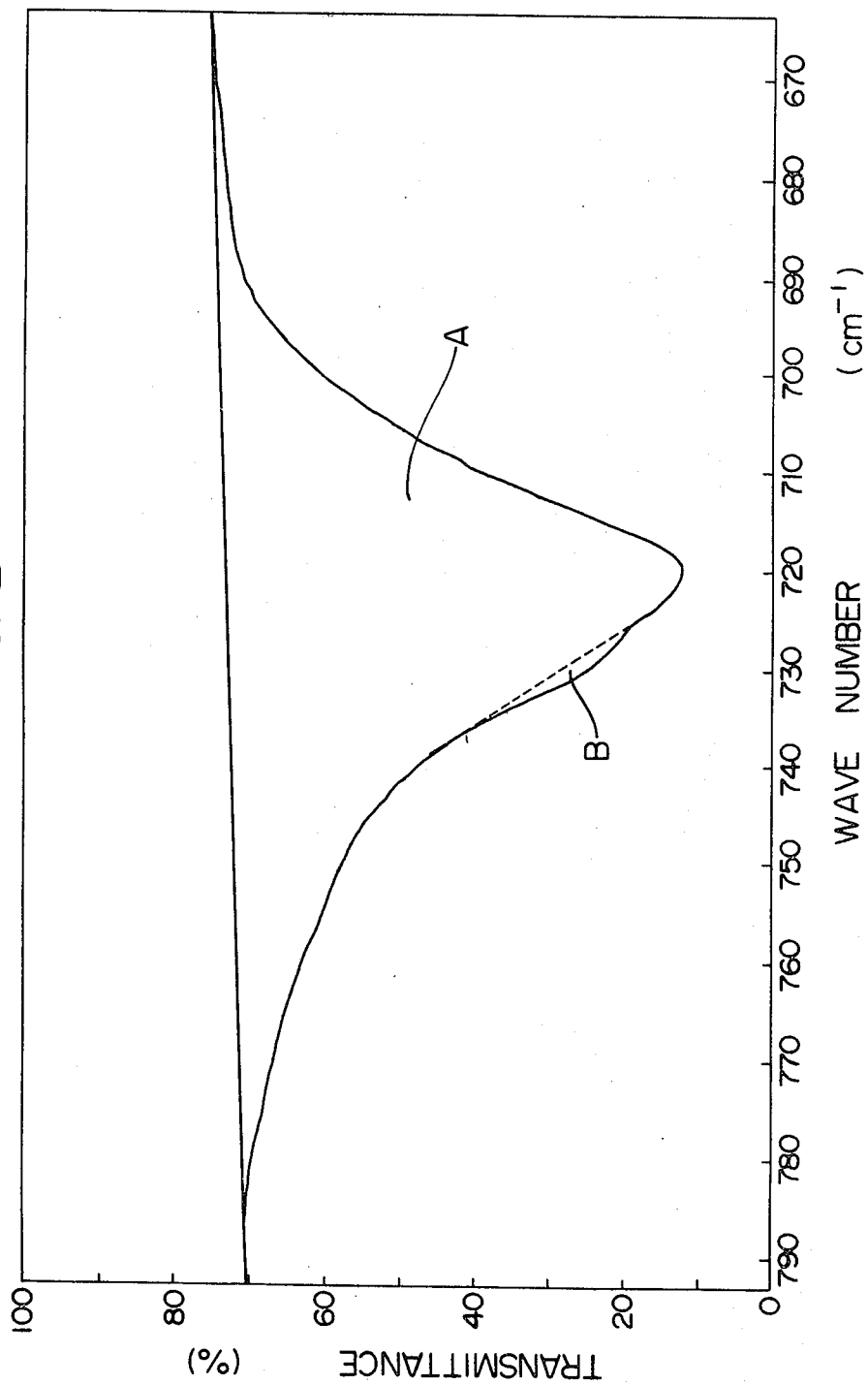
Figure 3:
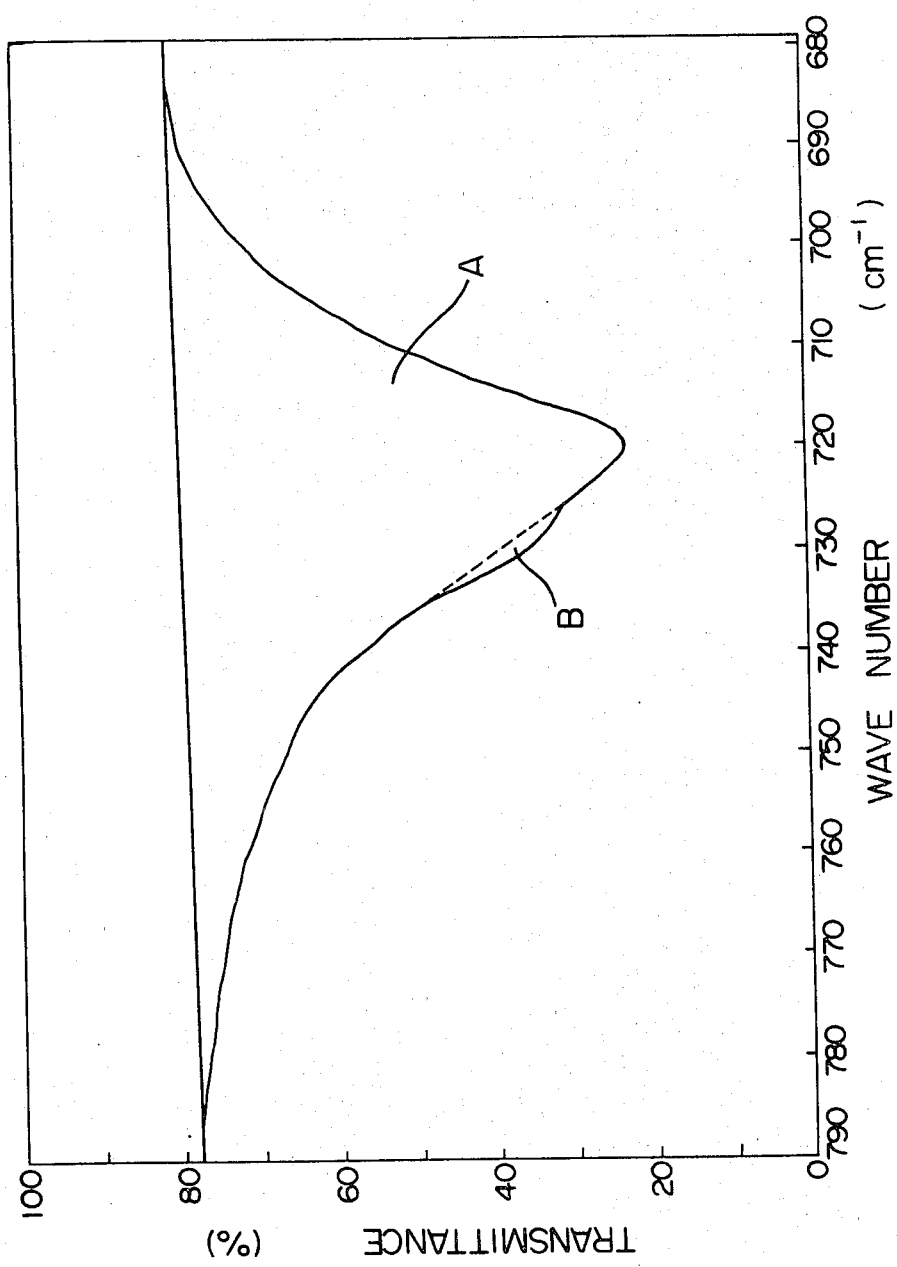
Figure 4:
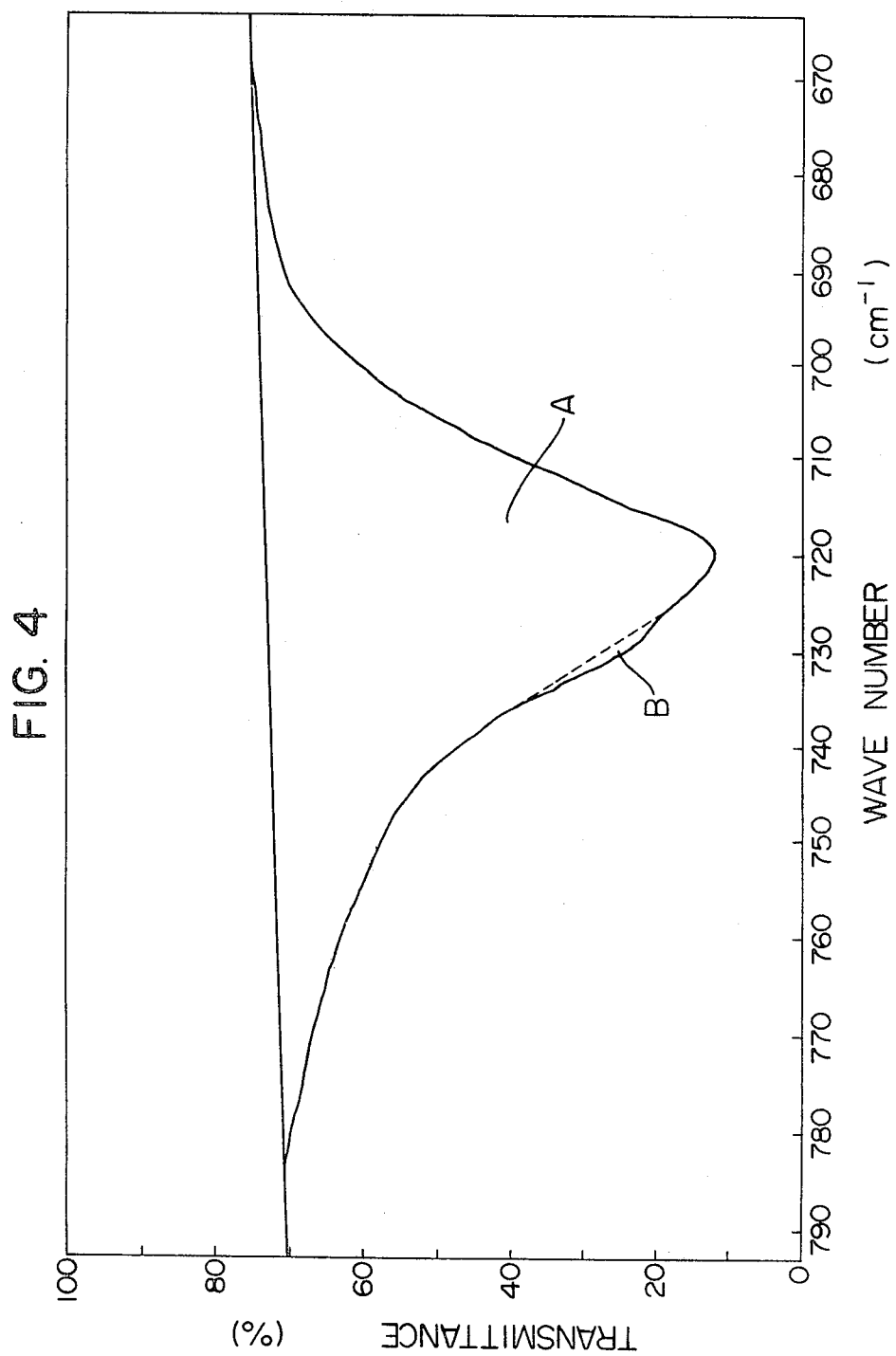

FIG. 1 is an infrared absorption spectral chart of the copolymer of Example 1;

FIG. 2, that of the copolymer of Example 5;

FIG. 3, that of the copolymer of Example 11;

FIG. 4, that of the copolymer of Example 15; and

Figure 5:
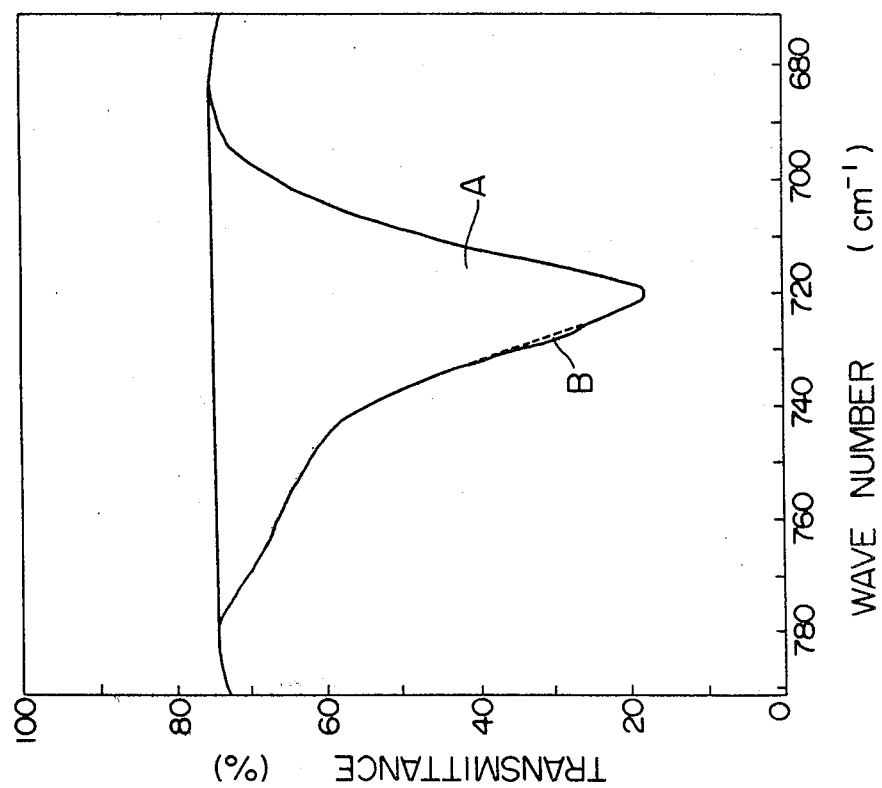

FIG. 5, that of the copolymer of Example 19.

EXAMPLE 1

(1) Production of a catalyst component (A)

(1) Production of titanium trichloride

A 200 ml three-necked flask, fully dried and purged with nitrogen, was charged with 50 millimoles of titanium tetrachloride and 50 ml of n-hexane, and with stirring at 0° C., 25 millimoles of triethyl aluminum was gradually added dropwise over the course of 1 hour. Then, the temperature of the mixture was raised to 20° C. over the course of 1 hour, and the mixture was aged at 20° C. for 2 hours. Solid titanium trichloride which precipitated was separated by filtration, washed fully with n-hexane, and then dried to afford reddish violet titanium trichloride.

(2) Dissolving of titanium trichloride

Two grams (10.1 millimoles as titanium) of the resulting titanium trichloride was taken into a 200 ml flask under nitrogen. Then, 50 ml of n-hexane was added, and with stirring, 20 millimoles of di-n-dodecyl ether was added. When the mixture was stirred at 20° C. for 1 hour, a deep brown n-hexane solution of titanium trichloride. di-n-dodecyl ether was obtained.

(2) Copolymerization

Stirring impellers, a three-way cock, a gas blowing tube and a thermometer were fitted to a 3-liter separable flask, and the inside of the flask was fully purged with nitrogen and dried. Then, 2000 ml of n-hexane dried and deaerated with molecular sieves was put into the flask. A dried gaseous mixture composed of ethylene (4 liters/min.), propylene (6 liters/min.) and hydrogen (1 liter/min.) was passed for 10 minutes through the gas blowing tube into the flask kept at 35° C.

Triisobutyl aluminum (7.0 millimoles) and 0.7 millimole, as titanium, of the catalyst component (A) were added, and copolymerization of ethylene and propylene was started. During the copolymerization, the gaseous monomeric mixture in the aforesaid amount was passed, and maintained at a temperature of 35° C. for 30 minutes. The copolymerization was stopped by adding 50 ml of methanol to the polymerization solution. The solution was homogeneous during the piolymerization, and no precipitation of the copolymer was noted during the copolymerization. The amount of the copolymer obtained was 53 g, and the propylene content of the copolymer was 43% by weight. R.I. of the copolymer determined from its infrared absorption spectrum (FIG. 1) was 1.1%.

The various properties of the copolymer obtained by this Example were as follows:

$ML_{1+4}^{100}$: 70.
100% Modulus: 11 kg/cm$^2$.
Tensile strength: 35 kg/cm$^2$.
Break elongation: 2500%.
Shore A hardness: 54.

COMPARATIVE EXAMPLE 1

Copolymerization was carried out in the same way as in Example 1 except that the solid titanium trichloride produced as in Example 1, (1), (1) was directly used as a catalyst instead of the titanium trichloride solution.

During the copolymerization, a large amount of a copolymer precipitated, and the copolymerization proceeded in slurry. The amount of the copolymer obtained was 16 g, and the propylene content of the copolymer was 38% by weight. The R.I. of the copolymer determined from its infrared absorption spectrum was 3.8%.

COMPARATIVE EXAMPLE 2

Copolymerization was carried out in the same way as in Example 1 except that 0.7 millimole of the solid titanium trichloride produced in Example 1, (1), (1) and 1.4 millimoles of di-n-dodecyl ether were separately added instead of the titanium trichloride solution.

During the copolymerization, a large amount of a copolymer precipitated, and the copolymerization proceeded in slurry. The amount of the copolymer obtained was 12 g, and the copolymer had a propylene content of 37% by weight and an R.I. determined from its infrared absorption spectrum of 3.6%.

COMPARATIVE EXAMPLE 3

Copolymerization was carried out in the same way as in Example 1 except that a hexane solution of a complex of titanium tetrachloride and di-n-dodecyl ether (equimolar proportions of titanium and the ether) was used instead of the titanium trichloride solution.

During the copolymerization, a large amount of a copolymer precipitated, and the copolymerization proceeded in slurry. The amount of the copolymer obtained was 6 g, and the copolymer had a propylene content of 36% by weight and an R.I. determined from its infrared absorption spectrum of 2.9%.

EXAMPLE 2

Copolymerization was carried out in the same way as in Example 1 except that over the course of 25 minutes from the start of the copolymerization to a point 5 minutes before its termination, a hexane solution of 5-ethylidene-2-norbornene was fed at a rate of 8 ml/min. (4 mmoles/min. of 5-ethylidene-2-norbornene). During the copolymerization, the solution was homogeneous, and no precipitation of the copolymer was noted. The amount of the copolymer obtained was 43 g, and the copolymer had a propylene content of 42%; an iodine value of 13, and an R.I. value determined from its infrared absorption spectrum of 1.2%.

The various properties of the copolymer obtained in this Example were as follows:

$ML_{1+4}^{100}$: 69.
100% Modulus: 12 kg/cm$^2$.
Tensile strength: 37 kg/cm$^2$.
Break elongation: 2800%.
Shore A hardness: 52.

EXAMPLE 3

Copolymerization was carried out in the same way as in Example 2 except that dicyclopentadiene was fed at a rate of 4 millimoles/min. instead of the 5-ethylidene-2-norbornene.

During the copolymerization, the solution was homogeneous, and no precipitation of a copolymer was noted. The amount of the copolymer obtained was 49 g, and the copolymer had a propylene content of 43% by weight, an iodine value of 12, and an R.I. value, determined from its infrared absorption spectrum, of 1.0%.

EXAMPLE 4

Dissolving of titanium trichloride and copolymerization were carried out in the same way as in Example 1 except that di-n-octyl ether was used to dissolve titanium trichloride instead of using di-n-dodecyl ether.

During the copolymerization, the solution was homogeneous, and no precipitation of a copolymer was noted. The amount of the copolymer obtained was 51 g. The copolymer had a propylene content of 44% by weight, and an R.I. value, determined from its infrared absorption spectrum, of 1.2%.

EXAMPLE 5

(1) Preparation of a catalyst component (A)

Two grams (10.1 millimoles as titanium) of the titanium trichloride obtained in Example 1, (1), (1) was taken into a 200 ml flask under nitrogen, and 50 ml of 1,2-dichloroethane was added. With stirring, 20 millimoles of di-n-octyl ether was added. When the mixture was stirred at 20° C. for 1 hour, a deep brown 1,2-dichloroethane solution of titanium trichloride.di-n-octyl ether was obtained.

(2) Copolymerization

Stirring impellers, a three-way cock, a gas blowing tube and a thermometer were fitted to a 3-liter separable flask, and the inside of the flask was fully purged with nitrogen, and dried. Then, 2000 ml of n-hexane dried and deaerated with molecular siezes was put into the flask. A dried gaseous mixture composed of ethylene (4 liters/min.), propylene (6 liters/min.) and hydrogen (1 liter/min.) was passed for 10 minutes through the gas blowing tube into the flask kept at 35° C. Tri-i-butyl aluminum (7.0 millimoles) and 0.7 millimole as titanium of the catalyst component (A) were added, and copolymerization of ethylene and propylene was started. During the copolymerization, the gaseous monomeric mixture was passed, and maintained at a temperature of 35° C. for 30 minutes. Then, 50 ml of methanol was added to stop the copolymerization. Water (1 liter) was added, and the reaction mixture was well stirred. Subsequent steam stripping afforded a solid copolymer rubber.

The amount of the copolymer rubber obtained was 52 g. The copolymer had a propylene content of 44% by weight, and an R.I. value, determined from its infrared absorption spectrum (see FIG. 2), of 0.7%.

The various properties of the copolymer obtained in this Examples were as follows:

$ML_{1+4}^{100}$: 73.
100% Modulus: 11 kg/cm$^2$.
Tensile strength: 2600%.
Shore A hardness: 53.

COMPARATIVE EXAMPLE 4

Copolymerization was carried out in the same way as in Example 5 except that the solid titanium trichloride produced in Example 5, (1) was directly used as a catalyst instead of the titanium trichloride solution. During the copolymerization, a large amount of a copolymer precipitated, and the copolymerization proceeded in slurry. The amount of the copolymer obtained was 19 g. The copolymer had a propylene content of 39% by weight and an R.I. of 3.7%.

COMPARATIVE EXAMPLE 5

Copolymerization was carried out in the same way as in Example 5 except that 0.7 millimole of the solid titanium trichloride produced in Example 1, (1), (1) and 1.4 millimoles of di-n-octyl ether were separately added.

During the copolymerization, a large amount of a copolymer precipitated, and the copolymerization proceeded in slurry. The amount of the copolymer obtained was 13 g. The copolymer had a propylene content of 38% by weight and an R.I. of 3.5%.

COMPARATIVE EXAMPLE 6

Copolymerization was carried out in the same way as in Example 5 except that a 1,2-dichloroethane solution of a complex of titanium tetrachloride and di-n-octyl ether (equimolar proportions of titanium and ether) was used instead of the titanium trichloride solution.

During the copolymerization, a large amount of a copolymer precipitated, and the copolymerization proceeded in slurry. The amount of the copolymer obtained was 5 g, and the copolymer had a propylene content of 35% by weight and an R.I. of 2.7%.

EXAMPLE 6

A catalyst component (A) was prepared in the same way as in Example 5 except that di-n-butyl ether was used to dissolve titanium trichloride. Copolymerization was carried out in the same way as in Example 5 using the resulting catalyst component (A). The amount of a copolymer obtained was 50 g, and the copolymer had a propylene content of 43% by weight and an R.I. of 0.8%.

EXAMPLE 7

A catalyst component (A) was prepared by operating in the same way as in Example 5 except that chlorobenzene was used to dissolve titanium trichloride. Copolymerization was carried out in the same way as in Example 5 using the resulting catalyst component (A).

The amount of the resulting copolymer was 53 g, and the copolymer had a propylene content of 44% by weight and an R.I. of 1.0%.

EXAMPLE 8

A catalyst component (A) was prepared in the same way as in Example 5.

Over the course of 25 minutes from the start of the copolymerization to a point 5 minutes before its termination, a hexane solution of 5-ethylidene-2-norbornene was fed at a rate of 8 ml/min. (4 millimoles/min. of 5-ethylidene-2-norbornene); otherwise, the copolymerization was performed in the same way as in Example 5.

The amount of the resulting copolymer was 49 g, and the copolymer had a propylene content of 43%, an iodine value of 14, and an R.I. of 0.8%.

EXAMPLE 9

Copolymerization was carried out in the same way as in Example 8 except that instead of 5-ethylidene-2-norbornene, dicyclopentadiene was fed at a rate of 4 millimoles/min.

The amount of the resulting copolymer was 47 g, and the copolymer had a propylene content of 43%, an iodine value of 15 and an R.I. of 0.9%.

EXAMPLE 10

A catalyst component (A) was prepared in the same way as in Example 5 except that in dissolving titanium trichloride, 1 millimole of iodine was added subsequent to the addition of di-n-octyl ether. The amount of the resulting copolymer was 50 g, and the copolymer had a propylene content of 44% by weight and an R.I. of 0.6%.

EXAMPLE 11

(1) Preparation of a catalyst component (A)

Two grams (10.1 millimoles of titanium) of titanium trichloride obtained in Example 1, (1), (1) was taken into a 200 ml flask under nitrogen, and 50 ml of 1,2-dichloroethane was added. With stirring, 3 millimoles of iodine was added, and the mixture was stirred at 20° C. for 1 hour. A blackish violet homogeneous solution was obtained.

(2) Copolymerization

Stirring impellers, a three-way cock, a gas blowing tube and a thermometer were fitted to a 3-liter separable flask, and its inside was fully purged with nitrogen and dried. Then, 2000 ml of n-hexane dried and deaerated with molecular sieves was put into the flask. A dried gaseous mixture composed of ethylene (4 liters/min.), propylene (6 liters/min.) and hydrogen (1 liter/min.) was passed for 10 minutes through the gas blowing tube into the flask kept at 35° C. Then, 7.0 millimoles of tri-i-butyl aluminum and 0.7 millimole, calculated as titanium, of the catalyst component (A) were added, and copolymerization of ethylene and propylene was started by passing the above gaseous mixture at the above flow rates. During the copolymerization, the temperature was maintained at 35° C., and the copolymerization was performed for 30 minutes. The copolymerization was then stopped by adding 50 ml of methanol to the polymerization solution. During the copolymerization, the solution was homogeneous, and no precipitation of a copolymer was noted.

The amount of the copolymer obtained was 35 g, and the copolymer had an R.I. value, determined from its infrared absorption spectrum (see FIG. 3), of 1.1%.

The properties of the copolymer obtained in this Example were as follows:
Propylene content: 40% by weight.
$ML_{1+4}^{100}$: 70.
100% Modulus: 10 kg/cm$^2$.
Tensile strength: 31 kg/cm$^2$.
Breaking elongation: 2400%.
Shore A hardness: 50.

COMPARATIVE EXAMPLE 7

Copolymerization was carried out in the same way as in Example 11 except that the solid titanium trichloride produced in Example 1, (1), (1) was used instead of the catalyst component (A).

During the copolymerization, a large amount of a copolymer precipitated, and the copolymerization proceeded in slurry.

The amount of the copolymer obtained was 16 g, and the copolymer had a propylene content of 38% by weight, and an R.I. value, determined from its infrared absorption spectrum, of 3.8%.

COMPARATIVE EXAMPLE 8

Copolymerization was carried out in the same way as in Example 1 except that titanium tetrachloride was used instead of the catalyst component (A).

During the polymerization, a large amount of a copolymer precipitated, and the copolymerization proceeded in slurry.

The amount of the copolymer obtained was 8 g, and the copolymer had a propylene content of 38% by weight and an R.I. value, determined from its infrared absorption spectrum, of 3.1%.

EXAMPLE 12

A catalyst component (A) was prepared in the same way as in Example 11 except that 2 millimoles of iodine trichloride was used instead of 3 millimoles of iodine. Using the resulting catalyst component (A), copolymerization was carried out in the same way as in Example 11.

During the copolymerization, the solution was homogeneous, and no precipitation of a copolymer was noted.

The amount of the copolymer obtained was 37 g, and the copolymer had a propylene content of 41% by weight and an R.I. value, determined from its infrared absorption spectrum, of 1.3%.

EXAMPLE 13

A catalyst component (A) was prepared in the same way as in Example 11.

Copolymerization was carried out in the same way as in Example 11 except that over the course of 25 minutes from the start of the copolymerization to a point 5 minutes before its termination, a hexane solution of 5-ethylidene-2-norbornene was fed at a rate of 8 ml/min. (4 millimoles/min. of 5-ethylidene-2-norbornene).

During the copolymerization, the solution was homogeneous, and no precipitation of a copolymer was noted.

The amount of the copolymer obtained was 29 g, and the copolymer had an R.I. value, determined from its infrared absorption spectrum, of 1.4%.

The various properties of the copolymer obtained in this Example were as follows:
Propylene content: 39% by weight.
Iodine value: 14.
$ML_{1+4}^{100}$: 71.
100% Modulus: 11 kg/cm$^2$.
Tensile strength: 32 kg/cm$^2$.
Breaking elongation: 2800%.
Shore A hardness: 51.

EXAMPLE 14

Copolymerization was carried out in the same way as in Example 13 except that dicyclopentadiene was used instead of 5-ethylidene-2-norbornene.

During the copolymerization, the solution was homogeneous, and no precipitation of a copolymer was noted.

The amount of the copolymer obtained was 31 g, and the copolymer had a propylene content of 40% by weight, an iodine value of 15, and an R.I. value, determined from its infrared absorption spectrum, of 1.2%.

EXAMPLE 15

(1) Preparation of a catalyst component (A)

(1) Co-pulverization of titanium trichloride and magnesium chloride

A vibratory mill pot was charged under an atmosphere of nitrogen with 20 g (101 millimoles as titanium atom) of a titanium trichloride composition (grade A) obtained by reducing titanium tetrachloride with metallic aluminum and 4.8 g (50 millimoles) of anhydrous magnesium chloride. The pot was made of SUS 314 stainless steel and had an inner capacity of 800 ml, and 330 balls made of SUS 314 stainless steel and having a diameter of 12.5 mm were packed into the pot.

The above materials were pulverized for 24 hours in the vibratory mill to obtain a co-pulverization product of titanium trichloride and magnesium chloride.

(2) Dissolving of the co-pulverization product

One gram (4.0 millimoles as titanium) of the resulting co-pulverization product was taken into a 100 ml flask under nitrogen, and 50 ml of 1,2-dichloroethane was added. With stirring, 9 millimoles of di-n-butyl ether was added. When the mixture was stirred at 20° C. for 1 hour, a deep brown homogeneous solution was obtained [catalyst component (A)].

(2) Copolymerization

Stirring impellers, a three-way cock, a gas blowing tube and a thermometer were fitted to a 3-liter separable flask, and its inside was sufficiently purged with nitrogen, and dried. Then, 2000 ml of n-hexane dried and deaerated with molecular sieves was put into the flask. A dried gaseous mixture of ethylene (4 liters/min.), propylene (6 liters/min.) and hydrogen (0.2 liter/min.) was passed for 10 minutes through the gas blowing tube into the flask kept at 35° C. Then, 7.0 millimoles of tri-i-butyl aluminum and 0.7 millimole, calculated as titanium, of the catalyst component (A) were added, and while passing the gaseous mixture, copolymerization was started. While maintaining the temperature at 35° C., the copolymerization was performed for 30 minutes. Subsequently, 50 ml of methanol was added to stop the copolymerization. Water (1 liter) was added, and the mixture was well stirred. Subsequent steam stripping afforded a solid copolymer rubber.

The amount of the copolymer obtained was 103 g, and the copolymer had an R.I., determined from its infrared absorption spectrum (see FIG. 4), of 0.5%.

The various properties of the copolymer obtained in this Example were as follows:

Propylene content: 46% by weight.
$ML_{1+4}^{100}$: 53.
100% Modulus: 10 kg/cm$^2$.
Tensile strength: 31 kg/cm$^2$.
Breaking elongation: 2900%.
Shore A hardness: 51.

EXAMPLE 16

A catalyst component (A) was prepared in the same way as in Example 15 except that di-n-octyl ether was used to dissolve the co-pulverization product of titanium trichloride and magnesium chloride. Copolymerization was carried out in the same way as in Example 15 except that the catalyst component (A) prepared as above was used.

The amount of the resulting copolymer was 112 g, and the copolymer had a propylene content of 45% by weight and an R.I. of 0.5%.

EXAMPLE 17

A catalyst component (A) was prepared in the same way as in Example 15. Copolymerization was carried out in the same way as in Example 15 except that over the course of 25 minutes from the start of the copolymerization to a point 5 minutes before its termination, a hexane solution of 5-ethylidene-2-norbornene was fed at a rate of 8 ml/min. (4 millimoles/min. of 5-ethylidene-2-norbornene).

The amount of the resulting copolymer was 97 g and the copolymer had a propylene content of 44% by weight, an iodine value of 13, and an R.I. of 0.4%.

EXAMPLE 18

Copolymerization was carried out in the same way as in Example 17 except that instead of the 5-ethylidene-2-norobornene, dicyclopentadiene was fed at a rate of 4 millimoles/min.

The amount of the resulting copolymer was 101 g, and the copolymer had a propylene content of 45% by weight, an iodine value of 14, and an R.I. of 0.6%.

EXAMPLE 19

(1) Preparation of a catalyst component (A)

Two grams (10.1 millimoles calculated as titanium) of titanium trichloride obtained by reducing titanium tetrachloride with metallic aluminum was taken into a 200 ml flask in an atmosphere of nitrogen, and 50 ml of 1,2-dichloroethane was added. With stirring, 18 millimoles (3.0 ml) of di-n-butyl ether was added. The mixture was stirred at 20° C. for 1 hour, and then, 2.0 ml of a 1,2-dichloroethane solution (1.0 mole/liter) of vanadium tetrachloride was added, and the mixture was further stirred at 20° C. for 1 hours to afford a deep brown homogeneous solution.

(2) Copolymerization

Stirring impellers, a three-way cock, a gas blowing tube and a thermometer were fitted to a 3-liter separable flask, and its inside was fully purged with nitrogen, and dried. Then, 2000 ml of n-hexane dried and deaerated with molecular sieves was put into the flask. A dried gaseous mixture composed of ethylene (4 liters/min.), propylene (6 liters/min.) and hydrogen (0.2 liter/min.) was passed for 10 minutes through the gas blowing tube into the flask kept at 35° C. Then, 1.8 ml (7.0 millimoles) of tri-i-butyl aluminum and 3.8 ml (0.7 millimole calculated as titanium) of the catalyst component (A) were added, and copolymerization was started by passing the gaseous mixture at the above rates. The copolymerization was carried out for 30 minutes while maintaining the temperature at 35° C. Subsequently, 50 ml of methanol was added to stop the copolymerization. Water (1 liter) was added, and the mixture was well stirred. Subsequent steam stripping afforded a solid copolymer rubber.

The resulting copolymer was a homogeneous rubber. Its amount was 109 g, and the copolymer had an R.I., determined from its infrared absorption spectrum (see FIG. 5), of 0.4%.

The various properties of the copolymer obtained in this Example were as follows:

Propylene content: 41% by weight.

$ML_{1+4}{}^{100}$: 53.
100% Modulus: 10 kg/cm$^2$.
Tensile strength: 34 kg/cm$^2$.
Breaking elongation: 3200%.
Shore A hardness: 52.

EXAMPLE 20

A catalyst component (A) was prepared in the same way as in Example 19 except that vanadium oxytrichloride was used instead of vanadium tetrachloride. Copolymerization was carried out in the same way as in Example 19 using the resulting catalyst component (A)

The amount of the resulting copolymer was 117 g, and the copolymer had a propylene content of 43% by weight, and an R.I. value of 0.5%.

EXAMPLE 21

A catalyst component (A) was prepared in the same way as in Example 19. Copolymerization was carried out in the same way as in Example 19 except that over the course of 25 minutes from the start of the copolymerization to a point 5 minutes before its termination, a hexane solution of 5-ethylidene-2-norbornene was fed at a rate of 8 ml/min. (2 millimoles/min. of 5-ethylidene-2-norbornene).

The amount of the resulting copolymer was 94 g, and the copolymer had a propylene content of 40% by weight, and an iodine value of 15, and an R.I. of 0.4%.

What we claim is:

1. A process for the production of a rubbery olefinic copolymer by copolymerization of at least two olefins which comprises copolymerizing at least two olefins in the presence of catalyst components (A) and (B) composed of
    (A) a liquid obtained by dissolving a solid titanium trichloride in a hydrocarbon, a halogenated hydrocarbon or a mixture thereof in the presence, as a solubilizing agent, of
        (1) 5–0.1 mol, based on 1 mol of titanium, of at least one ether compound represented by the formula $R^1OR^2$ wherein $R^1$ and $R^2$ are identical or different, and each represents an alkyl, alkenyl, aralkyl or aryl group having 1 to 12 carbon atoms, or
        (2) 10–0.01 mol, on the basis of 1 mol of titanium, of at least one compound selected from the group consisting of halogens, interhalogen compounds, halogen compounds of phosphorous or sulfur, and oxyhalogen compounds of phosphorous or sulfur and
    (B) an organic metal compound of a metal of Groups I–III in the periodic table being a liquid at room temperature, said copolymerization being effected by feeding to a reactor said catalyst components (A) and (B) in the form of a solution thereby obtaining a random copolymer made up of at least two of said olefinic comonomers, such that not one of the individual monomer units which make up the random copolymer exceeds 80% by weight of the random copolymer.

2. The process of claim 1 wherein the solution of the titanium compound further contains dissolved therein a magnesium compound of the general formula $MG(OR)_nX_{2-n}$ wherein OR represents an alkoxy group, X represents chlorine, bromine or iodine, and n is 0 or a positive number of not more than 2,
or a compound obtained by treating the magnesium compound with an electron donor and wherein the molar ratio of magnesium compound to titanium compound is 1:0.01 to 100.

3. The process of claim 1 wherein the solution of the titanium compound further contains a tetravalent or pentavalent vanadium halide compound and wherein the molar ratio of titanium compound to vanadium compound is from 1:0.01 to 10.

4. The process of claim 1 wherein the solid titanium halide is treated with 2 to 0.2 mole, per mole of the titanium halide, of an ether at a temperature of from $-30°$ C. to $120°$ C.

5. The process of claim 1 wherein the solid titanium halide is treated with 0.01 to 10 moles, per mole of the titanium halide, of the halogen or the inorganic halide at a temperature of from $-80°$ C. to $300°$ C.

6. The process of claim 1 wherein the solid titanium halide is used in a pulverized form.

7. The process of claim 2 wherein the solid titanium halide and the magnesium compound or the compound obtained by treating the magnesium compound with the electron donor are co-pulverized.

8. The process of claim 1 wherein the atomic ratio of component (A) to component (B) is from 1:0.2 to 1:200.

9. A process according to claim 1 in which the solvent is a hydrocarbon and the solubilizing agent is an ether compound having carbon numbers of 6–11 in $R^1$ and $R^2$.

* * * * *

UNITED STATES PATENT AND TRADEMARK OFFICE
CERTIFICATE OF CORRECTION

PATENT NO. : 4,377,671
DATED : March 22, 1983
INVENTOR(S) : Kenya MAKINO et al.

It is certified that error appears in the above-identified patent and that said Letters Patent is hereby corrected as shown below:

Title page, column 1, after "[73] Assignee:", change "Japan EP Rubber Co., Ltd., Mie, Japan" to --Japan Synthetic Rubber Co., Ltd., Tokyo, Japan--.

Signed and Sealed this

Eighteenth Day of June 1985

[SEAL]

Attest:

DONALD J. QUIGG

*Attesting Officer*  *Acting Commissioner of Patents and Trademarks*